(12) United States Patent
Toullec et al.

(10) Patent No.: US 11,831,944 B2
(45) Date of Patent: Nov. 28, 2023

(54) METHOD FOR MANAGING THE BROADCASTING OF MULTIMEDIA CONTENT, AND DEVICE FOR CARRYING OUT SAID METHOD

(71) Applicants: ATEME, Velizy Villacoublay (FR); INSTITUT MINES TELECOM, Palaiseau (FR)

(72) Inventors: Eric Toullec, Rennes (FR); Lucas Gregory, Rennes (FR); Jean Le Feuvre, Gometz le Chatel (FR)

(73) Assignees: ATEME, Velizy Villacoublay (FR); INSTITUT MINES TELECOM, Palaiseau (FR)

( * ) Notice: Subject to any disclaimer, the term of this patent is extended or adjusted under 35 U.S.C. 154(b) by 0 days.

(21) Appl. No.: 17/440,686

(22) PCT Filed: Mar. 17, 2020

(86) PCT No.: PCT/FR2020/050580
§ 371 (c)(1),
(2) Date: Sep. 17, 2021

(87) PCT Pub. No.: WO2020/188219
PCT Pub. Date: Sep. 24, 2020

(65) Prior Publication Data
US 2022/0191584 A1 Jun. 16, 2022

(30) Foreign Application Priority Data
Mar. 18, 2019 (FR) .................................... 19 02766

(51) Int. Cl.
*H04N 21/43* (2011.01)
*H04N 21/2343* (2011.01)
(Continued)

(52) U.S. Cl.
CPC . *H04N 21/43079* (2020.08); *H04N 21/23439* (2013.01); *H04N 21/44016* (2013.01); *H04N 21/8456* (2013.01)

(58) Field of Classification Search
CPC ....... H04N 21/43079; H04N 21/23439; H04N 21/44016; H04N 21/8456; H04N 21/26258; H04N 21/812
See application file for complete search history.

(56) References Cited

U.S. PATENT DOCUMENTS

2011/0125919 A1* 5/2011 Kwon ...................... G06F 15/16
2019/0104316 A1* 4/2019 Da Silva Pratas Gabriel ............ H04N 21/234345

OTHER PUBLICATIONS

"[CAPCO] Proposal: MPD chaining for pre/mid rolls", Iraj Sodagar., 113. MPEG Meeting; Oct. 19, 2015-Oct. 23, 2015; Geneva; (Motion Picture Expert Group or ISO/IEC JTC1/SC29/WG11), No. m37084, Oct. 14, 2015, 15 pages.
(Continued)

*Primary Examiner* — Anthony Bantamoi
(74) *Attorney, Agent, or Firm* — NIXON & VANDERHYE

(57) ABSTRACT

Disclosed is a method for managing multimedia content, involving: obtaining a first set of content description metadata describing a first multimedia content broadcast in dynamic mode; and upon reading, in the first set of metadata, data redirecting to a section of a second set of content description metadata, reading, in the section of the second set of metadata, data relating to a time synchronization for accessing a second multimedia content broadcast in dynamic mode.

20 Claims, 11 Drawing Sheets

(51) Int. Cl.
*H04N 21/44* (2011.01)
*H04N 21/845* (2011.01)

(56) References Cited

OTHER PUBLICATIONS

"EDASH: Server-based Ad Insertion based on DASH-IF", Qualcomm Incorporated, vol. SA WG4. No. Bratislava. Slovakia; Apr. 13, 2015-Apr. 17, 2015. Apr. 15, 2015 (Apr. 15, 2015). 3 GPP Draft; S4-150416_Ad-Insertion, $3^{rd}$ Generation Partnership Project (3GPP), Mobile Competence Centre; 650. Route Des Lucioles, Apr. 15, 2015, 14 pages.

"Technologies under Consideration for DASH", No. n17812, 123. MPEG Meeting; Jul. 16, 2018-Jul. 20, 2018; Ljubljana; (Motion Picture Expert Group or ISO/IEC JTC1/SC29/WG11), Jul. 20, 2018, 115 pages.

International Search Report for PCT/FR2020/050580 dated Jun. 23, 2020, 5 pages.

Written Opinion of the ISA for PCT/FR2020/050580 dated Jun. 23, 2020, 7 pages.

* cited by examiner

```
<?xml version="1.0" encoding="UTF-8"?>
<MPD
  availabilityStartTime="2019-01-28T08:37:57Z"
  maxSegmentDuration="PT2S"
  minBufferTime="PT2S"
  minimumUpdatePeriod="PT10S"
  profiles="urn:mpeg:dash:profile:isoff-live:2011"
  publishTime="2019-01-28T08:37:57Z"
  timeShiftBufferDepth="PT20S"
  type="dynamic"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemaLocation="urn:mpeg:dash:schema:mpd:2011 DASH-MPD.xsd">
    <Period id="P0" start="PT0S">
      <AdaptationSet contentType="video" id="0" maxFrameRate="25" maxHeight="1080" maxWidth="1920" mimeType="video/mp4" minFrameRate="25" minHeight="1080" minWidth="1920" par="16:9" segmentAlignment="true" startWithSAP="1">
        <Role schemeIdUri="urn:mpeg:dash:role:2011" value="main"/>
        <Representation bandwidth="4000000" codecs="hev1.2.4.L120.90" frameRate="25" height="1080" id="v1" sar="1:1" width="1920">
          <SegmentTemplate duration="2000000" initialization="$RepresentationID$-init.mp4" media="$RepresentationID$-$Number$.m4s" startNumber="1" timescale="1000000"/>
        </Representation>
      </AdaptationSet>
      <AdaptationSet contentType="audio" id="1" lang="und" mimeType="audio/mp4" segmentAlignment="true" startWithSAP="1">
        <Role schemeIdUri="urn:mpeg:dash:role:2011" value="main"/>
        <Representation audioSamplingRate="48000" bandwidth="128000" codecs="mp4a.40.2" id="a2">
          <AudioChannelConfiguration schemeIdUri="urn:mpeg:dash:23003:3:audio_channel_configuration:2011" value="2"/>
          <SegmentTemplate duration="2000000" initialization="$RepresentationID$-init.mp4" media="$RepresentationID$-$Number$.m4s" startNumber="1" timescale="1000000"/>
        </Representation>
      </AdaptationSet>
    </Period>
</MPD>
```

```xml
<?xml version="1.0" encoding="UTF-8"?>
<MPD
  availabilityStartTime="2019-01-28T08:37:57Z"
  maxSegmentDuration="PT2S"
  minBufferTime="PT2S"
  minimumUpdatePeriod="PT10S"
  profiles="urn:mpeg:dash:profile:isoff-live:2011"
  publishTime="2019-01-28T08:37:57Z"
  timeShiftBufferDepth="PT20S"
  UTCTiming=" urn:mpeg:dash:utc:http-ntp:2014"
  type="dynamic"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemaLocation="urn:mpeg:dash:schema:mpd:2011 DASH-MPD.xsd">
  <Period id="P0" start="PT0S" duration="PT2M18S">
     <AdaptationSet id="0" contentType="video" ...>
        <Representation id="v1" bandwidth="4000000" codecs="hev1.2.4.L120.90"
 frameRate="25" height="1080" width="1920" ...>
           <SegmentTemplate .../>
        </Representation>
     </AdaptationSet>
     <AdaptationSet id="1" contentType="audio" ...>
        <Representation id="a2" codecs="mp4a.40.2" audioSamplingRate="48000"
bandwidth="128000">
           <SegmentTemplate .../>
        </Representation>
     </AdaptationSet>
  </Period>
  <Period id="P1" start="PT138S" duration="PT30S" xlink:actuate="onLoad"
xlink:href="http://..." xmlns:xlink="http://www.w3.org/1999/xlink">
     <AdaptationSet id="0" contentType="video"...>
        <Representation id="v1" codecs="hev1.2.4.L120.90" bandwidth="4000000"
frameRate="25" height="1080" width="1920" ...>
           <SegmentTemplate .../>
        </Representation>
     </AdaptationSet>
     <AdaptationSet id="1" contentType="audio" ...>
        <Representation id="a2" codecs="mp4a.40.2" audioSamplingRate="48000"
bandwidth="128000">
           <SegmentTemplate .../>
        </Representation>
     </AdaptationSet>
  </Period>
  <Period id="P2" start="PT168S">
     <AdaptationSet id="0" contentType="video"...>
        <Representation id="v1" codecs="hev1.2.4.L120.90" bandwidth="4000000"
frameRate="25" height="1080" width="1920" ...>
           <SegmentTemplate .../>
        </Representation>
     </AdaptationSet>
     <AdaptationSet id="1" contentType="audio" ...>
        <Representation id="a2" codecs="mp4a.40.2" audioSamplingRate="48000"
bandwidth="128000">
           <SegmentTemplate .../>
        </Representation>
     </AdaptationSet>
  </Period>
</MPD>
```

```
<?xml version="1.0" encoding="UTF-8"?>
<MPD
  type="dynamic"
  availabilityStartTime="2019-01-28T08:37:57Z"
  publishTime="2019-01-28T08:37:57Z"
  availabilityEndTime="2019-01-28T08:37:57Z"
  minimumUpdatePeriod="PT10S"
  minBufferTime="PT2S"
  timeShiftBufferDepth="PT20S"
  UTCTiming=" urn:mpeg:dash:utc:http-ntp:2014"
  maxSegmentDuration="PT2S"
  profiles="urn:mpeg:dash:profile:isoff-live:2011"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemaLocation="urn:mpeg:dash:schema:mpd:2011 DASH-MPD.xsd">
    <Period id="P0" start="PT0S" duration= PT20S">
        <AdaptationSet id="0" contentType="video" ...>
        </AdaptationSet>
        <AdaptationSet id="1" contentType="audio" ...>
        </AdaptationSet>
    </Period>
    <Period id="P1" start="PT20S" duration= PT30S" xlink:actuate="onLoad"
xlink:href="http://..." xmlns:xlink="http://www.w3.org/1999/xlink">
        <AdaptationSet id="0" contentType="video" ...>
        </AdaptationSet>
        <AdaptationSet id="1" contentType="audio" ...>
        </AdaptationSet>
    </Period>
    <Period id="P2" start="PT50S">
        <AdaptationSet id="0" contentType="video" ...>
        </AdaptationSet>
        <AdaptationSet id="1" contentType="audio" ...>
        </AdaptationSet>
    </Period>
</MPD>
```

FIG. 6A

```
<?xml version="1.0" encoding="UTF-8"?>
<MPD
  type="dynamic"
  availabilityStartTime="2019-01-28T04:00:00Z"
  publishTime="2019-01-28T04:00:00Z"
  minimumUpdatePeriod="PT10S"
  minBufferTime="PT2S"
  timeShiftBufferDepth="PT20S"
  UTCTiming=" urn:mpeg:dash:utc:http-ntp:2014"
  maxSegmentDuration="PT2S"
  profiles="urn:mpeg:dash:profile:isoff-live:2011"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemalocation="urn:mpeg:dash:schema:mpd:2011 DASH-MPD.xsd">
    <Period id="P0" start="PT0S" duration= PT10H00M00S">
       <AdaptationSet id="0" contentType="video" ...>
       </AdaptationSet>
       <AdaptationSet id="1" contentType="audio" ...>
       </AdaptationSet>
    </Period>
    <Period id="P1" start="PT10H00M00S" xlink:actuate="onLoad"
xlink:href="http://..." xmlns:xlink="http://www.w3.org/1999/xlink">
       <AdaptationSet id="0" contentType="video" ...>
       </AdaptationSet>
       <AdaptationSet id="1" contentType="audio" ...>
       </AdaptationSet>
    </Period>

</MPD>
```

FIG. 6B

```xml
<?xml version="1.0" encoding="UTF-8"?>
<MPD
  type="dynamic"
  availabilityStartTime="2019-01-28T14:00:00Z "
  publishTime="2019-03-01T14:00:00Z "
  minimumUpdatePeriod="PT10S"
  minBufferTime="PT2S"
  timeShiftBufferDepth="PT10S"
  UTCTiming=" urn:mpeg:dash:utc:http-ntp:2014"
  maxSegmentDuration="PT2S"
  profiles="urn:mpeg:dash:profile:isoff-live:2011"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemaLocation="urn:mpeg:dash:schema:mpd:2011 DASH-MPD.xsd">
    <Period id="P100" start="PT0S>
      <LivePeriod
        type="dynamic"
        availabilityStartTime="2019-03-01T14:00:00Z"
        publishTime="2019-03-01T14:00:00Z "
        minimumUpdatePeriod="PT10S"
        minBufferTime="PT2S"
        timeShiftBufferDepth="PT10S"
        UTCTiming=" urn:mpeg:dash:utc:http-ntp:2014"
      />
      <AdaptationSet id="0" contentType="video" ...>
      </AdaptationSet>
      <AdaptationSet id="1" contentType="audio" ...>
      </AdaptationSet>
    </Period>
</MPD>
```

FIG. 6C

METHOD FOR MANAGING THE BROADCASTING OF MULTIMEDIA CONTENT, AND DEVICE FOR CARRYING OUT SAID METHOD

This application is the U.S. national phase of International Application No. PCT/FR2020/050580 filed Mar. 17, 2020 which designated the U.S. and claims priority to FR Patent Application No. 19 02766 filed Mar. 18, 2019, the entire contents of each of which are hereby incorporated by reference.

FIELD AND CONTEXT OF THE INVENTION

The present invention relates to the field of the delivery of data over a telecommunications network. In particular, it relates to the delivery of multimedia content (audio and/or video, subtitles, data, etc.) and especially to delivery in real time.

The world of delivery or broadcast of digital television has undergone real changes in recent years. To conventional delivery carried out in dynamic mode via pay-TV operators (e.g. satellite TV and/or Internet service providers (ISPs)) as regards so-called linear television (ADSL (standing for asymmetric digital subscriber line), satellite, cable, IPTV, fiber, digital terrestrial television (DTT), etc.), have been added new audiovisual services such as video on demand (VOD), or catch-up TV (or replay).

The design of new terminals that are ever more powerful and more mobile, the growing demand for consumption of content independent of the location of the consumer (TV everywhere), as well as the development of network infrastructures offering ever more bandwidth, have led to the emergence of a new market that does not require the access network used by users to be possessed, this market being called the over-the-top (OTT) market. The OTT market operates on so-called unmanaged networks (i.e. with bandwidth and quality of service (QoS) not guaranteed). These multi-screen OTT services are provided by broadcasters/rebroadcasters, i.e. television broadcasters and telecom operators.

The infrastructure used for content delivery has thus at the present time been doubled, there being one set of infrastructure for traditional broadcasting and (at least) one set of infrastructure for OTT delivery.

In order to address multi-screen content delivery services, various protocols have been developed: Apple HLS (HTTP Live Streaming), Microsoft Smooth Streaming (MSS), Adobe HTTP Dynamic Streaming (HDS), MPEG Dynamic Adaptive Streaming over HTTP (MPEG-DASH). All these protocols are based on the concept of http adaptive streaming (HAS).

Multi-screen content delivery typically uses a video delivery network head end comprising a video encoding unit that receives content to be encoded as input and delivers to a packager encoded streams known as "elementary streams". Content received as input is encoded according to a plurality of encoding profiles (a profile being for example defined with codec, resolution and bit-rate parameters).

The encoded streams (elementary streams) delivered by the video encoding unit are split within the packager into at least two sequences, audio and video sequences respectively, of successive segments, the segments generally being of set duration (typically a few seconds) and of format dependent on the chosen protocol (for example MPEG2-TS, MP4, etc.). For each content, a set of metadata relative to multimedia contents, which is sometimes called a media presentation description (MPD) or manifest, or indeed a container, is also generated by the packager, for example in the form of a file, for example in XML format, indicating the characteristics of each profile and the available segments corresponding to the content.

These manifests and the associated segments are supplied by the packager to a content server, then stored on content delivery networks (CDNs), these providing cache capacities that make it possible to improve quality of service, and to minimize access times and the latency with which content may be viewed by player terminals.

A terminal for playing video content delivered in dynamic mode (for example a terminal configured within a user device such as a smartphone, tablet or any other type of computer), or in other words dynamic or live video content (as opposed to static video content, such as VOD content for example), will typically be configured to play this content using the information contained in the manifest associated with the content.

Playing live multimedia content, i.e. content delivered in dynamic mode, on the basis of the associated manifest however has limitations, with regard to certain new use cases involving splicing from a first live content in the process of being played to a second live content. Specifically, existing mechanisms making it possible to splice from a first multimedia content to a second multimedia content do not allow these new use cases to be satisfactorily managed.

The aim of the invention is to improve the situation.

According to a first aspect, a method of managing multimedia contents is proposed. The method comprises, in one or more embodiments: obtaining a first set of content description metadata describing a first multimedia content delivered in dynamic mode; and upon reading, from the first set of metadata, redirect data for redirecting to a section of a second set of content description metadata, reading from the section of the second set of metadata data relative to a temporal synchronization of the access to a second multimedia content delivered in dynamic mode.

The proposed method advantageously makes it possible to use redirect data to splice from a first multimedia content delivered in dynamic mode to a second multimedia content delivered in dynamic mode, on the basis of a single set of content description metadata into which the redirect data is inserted.

For example, in the third edition of the ISO/IEC 23009-1 specification ("Information technology—Dynamic adaptive streaming over http (DASH)—Part 1: Media presentation description and segment formats"), which provides for the possibility of using redirect data in the form of an "xlink" that may be inserted into a time-interval container of a manifest (which corresponds to a set of content description metadata), an xlink cannot be used to splice during playback from a first content delivered in dynamic mode to a second content delivered in dynamic mode. The proposed method provides for modifying the use of xlinks by inserting into the resolution of such a link a read-out of temporal-synchronization data for the access to the second content delivered in dynamic mode.

Thus, the proposed method advantageously makes it possible to insert into the resolution of redirect data, i.e., into the obtainment of the data to which the redirection gives access, the access to temporal-synchronization data for the access to the second content delivered in dynamic mode.

This makes it possible, in the case of xlinks specified according to the DASH standard, to considerably broaden the use cases of this type of link, while benefiting more broadly from the advantages thereof, such links in particular allowing a splice during playback between two contents, possibly both delivered in dynamic mode, without changing the manifest being read for the access to the contents.

The proposed method is particularly suitable, albeit non-limitingly, for playing, with a player terminal device, multimedia contents delivered in live mode in an MPEG DASH, HLS, HDS, MSS or HAS format. However, it is also suitable for playing multimedia contents delivered in live mode in any format in which these contents are played using sets of content description metadata corresponding to multimedia contents delivered in live mode.

The proposed method will possibly advantageously be implemented in any device configured to play multimedia content, on the basis of a set of multimedia-content description metadata, for example in accordance with the MPEG DASH, HLS, HDS, MSS, or HAS standards, such as, non-limitingly, any computer, smartphone, user equipment, video player, video player terminal, tablet, etc.

In one or more embodiments, the second set of content description metadata will possibly describe the second multimedia content delivered in dynamic mode.

In one or more embodiments, the data relative to a temporal synchronization for the access to the second multimedia content delivered in dynamic mode may be read, from the second set of content description metadata, from a time-interval description container relative to the second multimedia content.

In one or more embodiments, the data relative to a temporal synchronization for the access to the second multimedia content delivered in dynamic mode may comprise data indicating a timestamp of availability of the second multimedia content.

In one or more embodiments, the data relative to a temporal synchronization for the access to the second multimedia content delivered in dynamic mode may comprise data indicating information on accessibility of segments of the second multimedia content.

In one or more embodiments, the data relative to a temporal synchronization for the access to the second multimedia content delivered in dynamic mode may correspond, entirely or partially, to data relative to a temporal synchronization that are provided in a root element of the second set of metadata.

In one or more embodiments, the first and second sets of metadata are manifests in DASH format, DASH standing for dynamic adaptive streaming over HTTP, HTTP standing for hypertext transfer protocol.

In one or more embodiments, the data relative to a temporal synchronization for the access to the second multimedia content delivered in dynamic mode will possibly comprise data indicating a timestamp of availability of a first segment of the second content, data indicating a common duration used in the definition of bit rates associated with the second content and data indicating a timestamp of generation of the second set of metadata and of its publication on a multimedia content delivery network. In one or more embodiments, these data may further comprise one or more among data indicating a type of delivery of the second content, data indicating a timestamp of generation of a segment of the oldest second content still available, clock data, and data indicating a duration of a shortest timeshift buffer used for the second content.

According to a second aspect, a device for playing multimedia content is provided, this device comprising a processor and a memory that is operationally coupled to the processor, wherein the processor is configured to implement the proposed method according to one or more embodiments.

According to another aspect, a method for managing multimedia content is provided, this method comprising: obtaining a first set of content description metadata describing a first multimedia content delivered in dynamic mode; and upon reading, from the first set of metadata, redirect data for redirecting to a section of a second set of content description metadata, reading from the section of the second set of metadata data relative to a temporal synchronization of the access to a second multimedia content delivered in dynamic mode corresponding to the second set of content description metadata.

According to another aspect, a method for managing multimedia content is provided, this method comprising: reading, on the basis of a redirect link in a first set of content description metadata describing a first multimedia content delivered in dynamic mode, from a predefined section of a second set of description metadata of the content, data relative to a temporal synchronization of the access to a second multimedia content delivered in dynamic mode corresponding to the second set of content description metadata.

According to another aspect, a set of content description metadata describing multimedia content delivered in dynamic mode is provided, this set comprising, in a container describing a time interval, data relative to a temporal synchronization for the access to the multimedia content.

According to another aspect, a manifest in DASH format describing multimedia content delivered in dynamic mode is provided, this manifest comprising, in a container of "Period" type, data relative to a temporal synchronization for the access to the multimedia content.

According to another aspect, the following are provided: a computer program, which is loadable into a memory associated with a processor, and comprises segments of code for implementing the proposed method according to one or more embodiments on execution of said program by the processor, and a data set representing, for example in compressed or encoded format, said computer program.

Another aspect relates to a non-volatile medium for storing a computer-executable program, comprising a data set representing one or more programs, said one or more programs comprising instructions that, on execution of said one or more programs by a computer comprising a processing unit operationally coupled to memory means and to an input/output interface module, cause the computer to manage multimedia content according to one or more embodiments of the proposed method.

BRIEF DESCRIPTION OF THE DRAWINGS

Other particularities and advantages of the present invention will become apparent from the following description of non-limiting examples of embodiments, which description is given with reference to the appended drawings, in which:

FIG. 2a illustrates an example of a set of content description metadata (or manifest).

FIG. 2b illustrates an example of a set of content description metadata (or manifest).

FIG. 6a illustrates an example of a set of content description metadata (or manifest).

FIG. 6b illustrates an example of a set of content description metadata (or manifest).

FIG. 6c illustrates an example of a set of content description metadata (or manifest).

DETAILED DESCRIPTION

Figure 1:
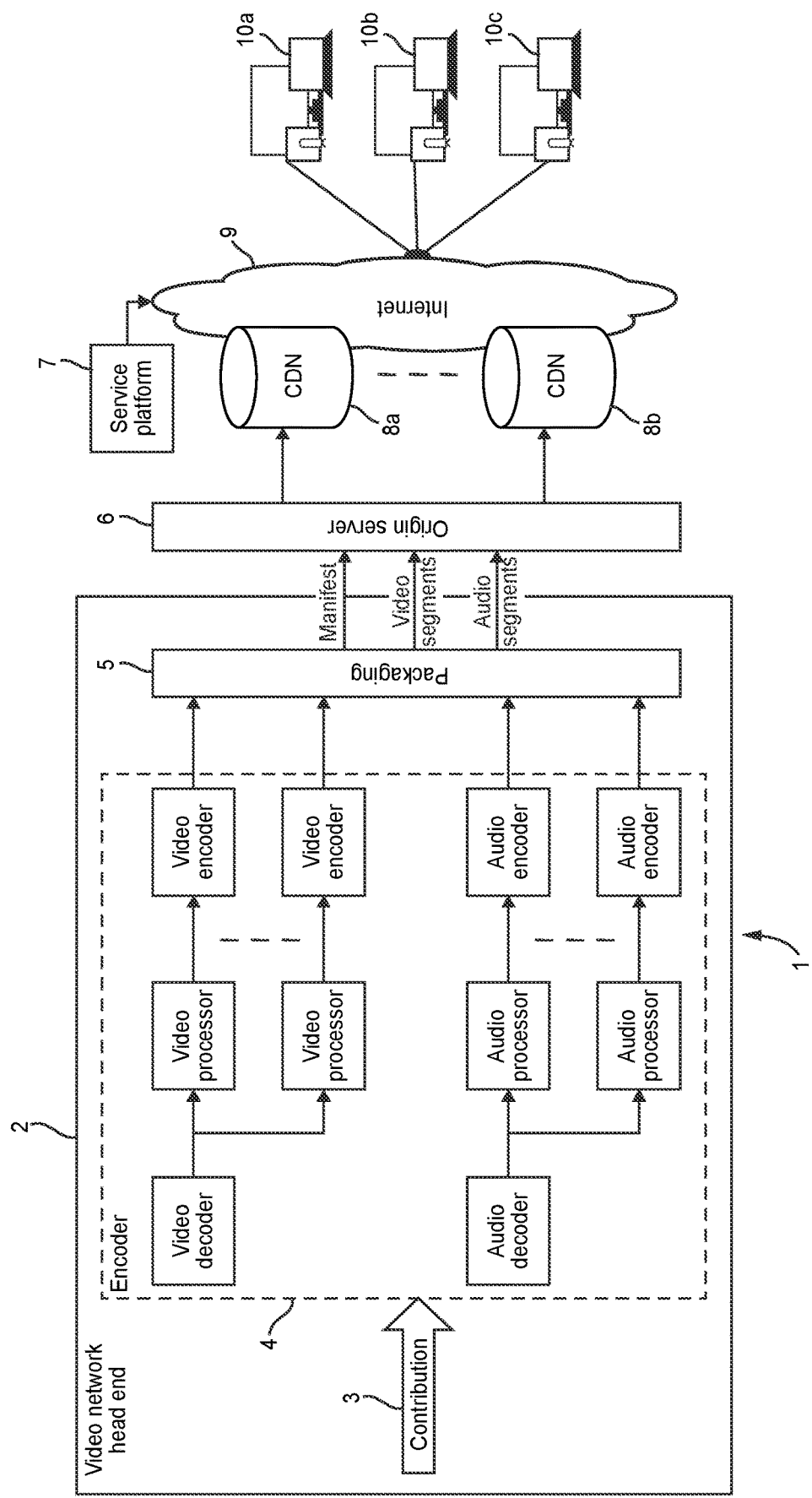
FIG. 1 illustrates an example of delivery infrastructure according to one or more embodiments.

In the following detailed description of embodiments of the method, many specific details are presented to provide a more complete understanding. Nevertheless, a person skilled in the art may realize that embodiments may be implemented without these specific details. In other cases, well-known characteristics are not described in detail to avoid needlessly complicating the description.

The present description refers to functions, engines, units, modules, platforms, and illustrations of diagrams of the methods and devices according to one or more embodiments. Each of the functions, engines, modules, platforms, units and charts described may be implemented in the form of hardware, software (including in the form of firmware or middleware), microcode, or any combination thereof. In the case of implementation in software form, the functions, engines, units, modules and/or illustrations of diagrams may be implemented by computer-program instructions or software code, which may be stored or transmitted on a computer-readable medium, including a non-volatile medium, or a medium loaded into the memory of a generic or specific computer, or of any other programmable apparatus or device for processing data, to produce a machine such that the computer-program instructions or the software code executed on the computer or the programmable apparatus or device for processing data form means of implementing these functions.

Embodiments of a computer-readable medium include, non-exhaustively, computer storage media and communication media, including any medium that facilitates the transfer of a computer program from one location to another. By "computer storage medium/media" what is meant is any physical medium that may be accessed by a computer. Examples of computer storage media include, non-limitingly, flash-memory components or disks or any other flash-memory devices (e.g. USB keys, memory sticks), CD-ROMs or other optical data-storage devices, DVDs, magnetic-disk-based data-storage devices or other magnetic data-storage devices, memory components for storing data, RAMs, ROMs, EEPROMs, memory cards (smart cards), SSD memories (SSD standing for solid state drive), and any other form of medium that may be used to transport or store data or data structures that may be read by a computer processor.

Furthermore, various forms of computer-readable medium are able to transmit or transport instructions to a computer, such as a router, gateway, server, or any equipment for transmitting data, whether it be a question of wired transmission (via coaxial cable, optical fiber, telephone wires, DSL cable, or Ethernet cable), of wireless transmission (via infrared, radio, cell, microwaves), or of transmission using virtualized transmitting equipment (virtual router, virtual gateway, virtual tunnel end point, virtual firewall). The instructions may, depending on the embodiment, comprise code in any computer programming language or of any computer program element, such as, non-limitingly, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

In addition, the terms "in particular", "especially", "for example", "example" and "typically" are used in the present description to designate examples or illustrations of non-limiting embodiments, which do not necessarily correspond to embodiments that are preferred or advantageous with respect to other possible aspects or embodiments.

By "server" or "platform" what is meant in the present description is any point of service (whether virtualized or not) or device hosting data-processing operations, one or more databases, and/or data-communication functions. For example, non-limitingly, the term "server" or the term "platform" may refer to a physical processor that is operationally coupled with associated communication, database and data-storage functions, or refer to a network, group, set or complex of processors and associated data-storage and networking equipment, and to an operating system and one or more database systems and applications that support the services and functions provided by the server. A computing device may be configured to send and receive signals, via one or more wireless and/or wired transmission networks, or may be configured to process and/or store data or signals, and may therefore operate as a server. Thus, equipment configured to operate as a server may include, by way of non-limiting examples, dedicated rack-mounted servers, desktops, laptops, service gateways (sometimes referred to as "boxes" or "residential gateway"), multimedia decoders (sometimes called "set-top boxes") and integrated equipment combining various functionalities, such as two or more of the functionalities mentioned above. The servers may vary widely in their configuration or capabilities, but a server will generally include one or more central processing units and a memory. A server may thus include one or more mass-memory devices, one or more power supplies, one or more wireless and/or wired network interfaces, one or more input/output interfaces, and one or more operating systems, such as Windows Server, Mac OS X, Unix, Linux, FreeBSD, or an equivalent.

By multimedia content, what is meant in the present description is any audio and/or video content, subtitles, data, audiovisual content, music, sound, image, or interactive graphical interface, and any combination of these types of content.

The terms "network" and "communication network" such as used in the present description refer to one or more data links which may couple or connect equipment, possibly virtualized equipment, so as to allow the transport of electronic data between computer systems and/or modules and/or other electronic devices or equipment, such as between a server and a client device or other types of devices, including between wireless devices coupled or connected by a wireless network, for example. A network may also include a mass memory for storing data, such as an NAS (network attached storage), a SAN (storage area network), or any other form of media readable by a computer or by a machine, for example. A network may comprise, in whole or in part, the Internet, one or more local area networks (LANs), one or more wide area networks (WANs), wired connections, wireless connections, cellular connections, or any combination of these various networks. Similarly, subnets may use various architectures or be compliant or compatible with various protocols, and interoperate with larger networks. Various types of equipment may be used to make various architectures or various protocols interoperable. For example, a router may be used to provide a communications link or a data link between two LANs that would otherwise be separate and independent.

The terms "operationally coupled", "coupled", "mounted" and "connected" and the various variations and forms thereof used in the present description refer to couplings, connections and mountings that may be direct or indirect, and that in particular comprise connections between electronic equipment, or between portions of such equipment, that allow operations and functions such as described in the present description. In addition, the terms "connected" and "coupled" are not limited to physical or mechanical connections or couplings. For example, an operational coupling may include one or more wired connections and/or one or more wireless connections between two or more pieces of equipment, allowing simplex and/or duplex communication links to be set up between the equipment or portions of the equipment. According to another example, a connection or an operational coupling may include a coupling via a wired and/or wireless link, to allow communication of data between a server of the proposed system and another piece of equipment of the system.

The term "application" (AP) and its variants (app, webapp, etc.) such as used in the present description correspond to any tool which functions and is operated by means of a computer, to provide or execute one or more functions or tasks for a user or another application. In order to interact with an application, and to control it, a user interface may be provided on the equipment on which the application is implemented. For example, a graphical user interface (GUI) may be generated and displayed on a screen of the user device, or an audio user interface may be rendered to the user using a loudspeaker, headphones or an audio output.

The terms "multimedia content" such as used in the present description correspond to any audio and/or video or audiovisual content.

In the present description, the terms delivery "in real time", delivery "in linear mode", delivery "in linear TV mode", delivery "in dynamic mode" and delivery "live" or "in live mode" are used interchangeably to designate delivery in dynamic mode or of dynamic type (i.e. live or dynamic delivery) of a multimedia content in a system for delivering contents to terminals, comprising in particular the delivery of the content as it is generated, as opposed to the delivery of a previously generated content on request by a user (delivery on demand or delivery in "static" mode or of "static" type), such as, for example, a content stored on a server, and made available to users via a video-on-demand (VOD) service.

In the present description, the terms "live content" refer to a content, for example of multimedia type, delivered, for example OTT, in dynamic mode (as opposed to in the static delivery mode). A live content will typically be generated by a television channel, or by any type of producer of televisual media, and will moreover be broadcast over a multimedia content broadcast network, in addition to being made available on content servers in an OTT delivery system.

In the present description, the terms "terminal", "user equipment", "player", "player device", "player terminal" and "video player" are used interchangeably to designate any type of device, implemented via one or more software packages, one or more pieces of hardware, or a combination of one or more software packages and one or more pieces of hardware, that is configured to use a multimedia content delivered according to a multi-screen delivery protocol, in particular by loading and playing the content. The terms "client" and "video player client" are also used interchangeably to designate any type of device, software and/or hardware, or any function or set of functions, implemented by software and/or hardware within a device, and configured to use a multimedia content delivered according to a multi-screen delivery protocol, in particular by loading the content from a server and playing the content.

FIG. 1 illustrates an example of an architecture of a system (1) for delivering multimedia content, in which system the proposed method may be implemented. FIG. 1 shows a video delivery network head end (2) comprising a video encoding unit (4) that receives content to be encoded ("contribution") (3) as input, and delivers to a packager (5) encoded streams called "elementary streams". As illustrated in FIG. 1, a content received as input is encoded according to a plurality of encoding profiles (a profile being for example defined with codec, resolution and bit-rate parameters). Using a plurality of encoding profiles has at least two advantages: First of all, a plurality of profiles makes it possible to address player terminals with different characteristics (supported codecs, screen resolution, decoding power). Furthermore, it allows the video players of these terminals to adapt depending on the available network bandwidth. Specifically, the player of a client (of a terminal) may be configured to seek to achieve the encoding profile corresponding to the highest bit rate, depending on bandwidth measurements that it continuously performs.

The encoded streams (elementary streams) delivered by the video encoding unit (4) to the packager are split by the packager (5) into two sequences, audio and video sequences respectively, of successive segments, these segments generally being of set duration (typically a few seconds) and of format dependent on the chosen protocol (for example MPEG2-TS, MP4, etc.). For each content, a set of metadata relative to multimedia contents, or manifest, is also generated by the packager. It is typically a question of a file, for example in XML format, indicating the characteristics of each profile and the available segments corresponding to the content.

These manifests and the associated segments are supplied by the packager (5) to a content server (6) ("Origin server" in FIG. 1), then stored on content delivery networks (CDNs) (8a, 8b), these providing cache capacities that make it possible to improve the quality of service provided to users, and to minimize access times and the latency with which content may be viewed by player terminals.

The contents stored in the CDN servers (8a, 8b) are read accessible to user terminals (10a, 10b, 10c), by means of a service platform (7) for the delivery of the contents. Clients installed in the terminals (10a, 10b, 10c) may access the contents stored on the CDN servers via one or more data communication networks, such as for example the Internet (9), as illustrated in the figure.

FIG. 2a illustrates an example of the content of an XML file corresponding to a manifest using the DASH (or MPEG-DASH) format. A manifest of this type contains a tree structure of nested XML containers, as shown in FIG. 2a. Although this description provides examples of embodiments based on the DASH format, as specified in the third edition of the document ISO/IEC 23009-1 "Information Technology—Dynamic adaptive streaming over HTTP (DASH)—Part 1: Media presentation description and segment formats", those skilled in the art may realize that the proposed methods are not limited to a particular type or format of manifest (or set of multimedia-content description metadata), and that they are applicable to any type of manifest, such as manifests using other OTT-delivery protocols and formats, such as for example the HLS, MSS and HDS protocols and formats mentioned above.

The DASH manifest shown in FIG. 2a has a hierarchical structure organized according to the following tree structure:

A root element of the document (i.e. the media presentation description, or MPD) contains the attributes applicable to all of the elements of the document (the other elements being sometimes called "child" elements).

The "MPD" root may, in addition to "child" elements, define values of attributes, including the following attributes which relate to the delivery of a live content:

The attribute "type" defines the type of content delivery: "static" for contents delivered in static mode (typically contents delivered by a video-on-demand (VOD) service) and "dynamic" for contents delivered in dynamic mode.

The attribute "AvailabilityStartTime", which relates to the dynamic delivery mode, defines the date (for example in coordinated-universal-time (UTC) format) of availability of the first segment generated for the current service. This information may be used to indicate the start time of the service, so as to be used by a player terminal as a time point to which to anchor the start of the service.

The attribute "PublishTime" indicates a date of generation of the manifest and of its publication on the CDN. This information makes it possible to store various versions of the same manifest corresponding to successive publications, in order to detect changes that have occurred from one publication to another.

The attribute "AvailabilityEndTime" indicates a date of generation of the oldest segment still available.

The attribute "MinimumUpdatePeriod" defines the shortest period between potential changes in the MPD. The value of this attribute may be used by the content player terminal to configure a frequency at which it downloads the manifest, being informed of the fact that the manifest will be updated by the packager at least at the frequency indicated by this attribute.

The attribute "MinBufferTime", which is mandatory in the format example shown in FIG. 2a, defines a common duration used in the definition of the bit rates of the representations.

The attribute "TimeShiftBufferDepth" defines the duration of the shortest timeshift buffer for all the representations of the manifest, guaranteeing the availability of the segments for deliveries of dynamic type. Its value indicates the past period for which the content associated with the manifest, delivered in dynamic mode, is available on the CDN server. This value may for example be equal to 1 minute, in which case the player may rewind ("live" content) by one minute, or retrieve one minute of live content in the case where the user uses the "pause" function to interrupt playback of live content.

The attribute "SuggestedPresentationDelay" defines a set time delay that may be applied during the presentation of each access unit. This parameter makes it possible to get as close as possible to the live edge of the content, to ensure that all player terminals playing the same live content will play it at the same place. For example, the player may be configured to start playing 4 seconds in the past, to give a margin of safety in relation to the course of the live content.

The "UTCTiming" attribute provides a common clock between the packager and the player terminal (or video player). It makes it possible to indicate to the terminal a means making it possible to retrieve a clock synchronized with the content server.

In addition, "child" elements, in the form of containers that may be nested within each other, may be included in the manifest to specify the files accessible through the manifest. With reference to FIG. 2a, these "child" elements may be:

An element of type "Period", describing a time interval, bounded or not in time. One or more attributes may be provided for an element of "Period" type, among which attributes an attribute ("id") identifying the period ("id="P0"" in FIG. 2), an attribute ("start") defining period start time ("start="PT0S"" in FIG. 2), and an attribute ("duration") defining period duration (not present for an open period, i.e. one that has not yet ended). The value of the attribute defining period start time (0 seconds in the example shown in FIG. 2a) will possibly be combined with the value of the element "availabilityStartTime" described above).

Each child element of "Period" type may itself contain child elements. For example, as illustrated in FIG. 2a, an element of "Period" type may contain two child elements of "AdaptationSet" type each corresponding to one type of content.

The element of "AdaptationSet" type is a container that allows available contents to be described depending on their type. It makes it possible to group together elements regarding the same component of a multimedia content (such as audio, video or subtitles) but encoded with different parameters (different bit rates, resolutions, frame rates, sampling rates). In the example of FIG. 2, only one encoding profile is available, and this profile is described with respect to its video component (contentType="video" id="0" maxFramerate="25" maxHeight="1080" maxWidth="1920" mimeType="video/mp4" minFrameRate="25" minHeight="1080" minWidth="1920" par="16:9" segmentAlignment="true" startWithSAP="1") and with respect to its audio component (contentType="audio" id="1" lang="und" mimeType="audio/mp4" segmentAlignment="true" startWithSAP="1"). A video player may thus, for example, quickly obtain the video-encoding-profile parameters used to encode the content described in the manifest illustrated in FIG. 2: bandwidth, parameters of the video encoder, frame rate, resolution, format of the images, etc. ("bandwidth="4000000" codecs="hev1.2.4.L120.90" frameRate="25" height="1080" id="v1" sar="1:1" width="1920").

Encoding parameters may be supplied via the "Representation" element, which makes it possible to precisely describe the encoding parameters of and parameters of access to a component of the media.

Figure 3:
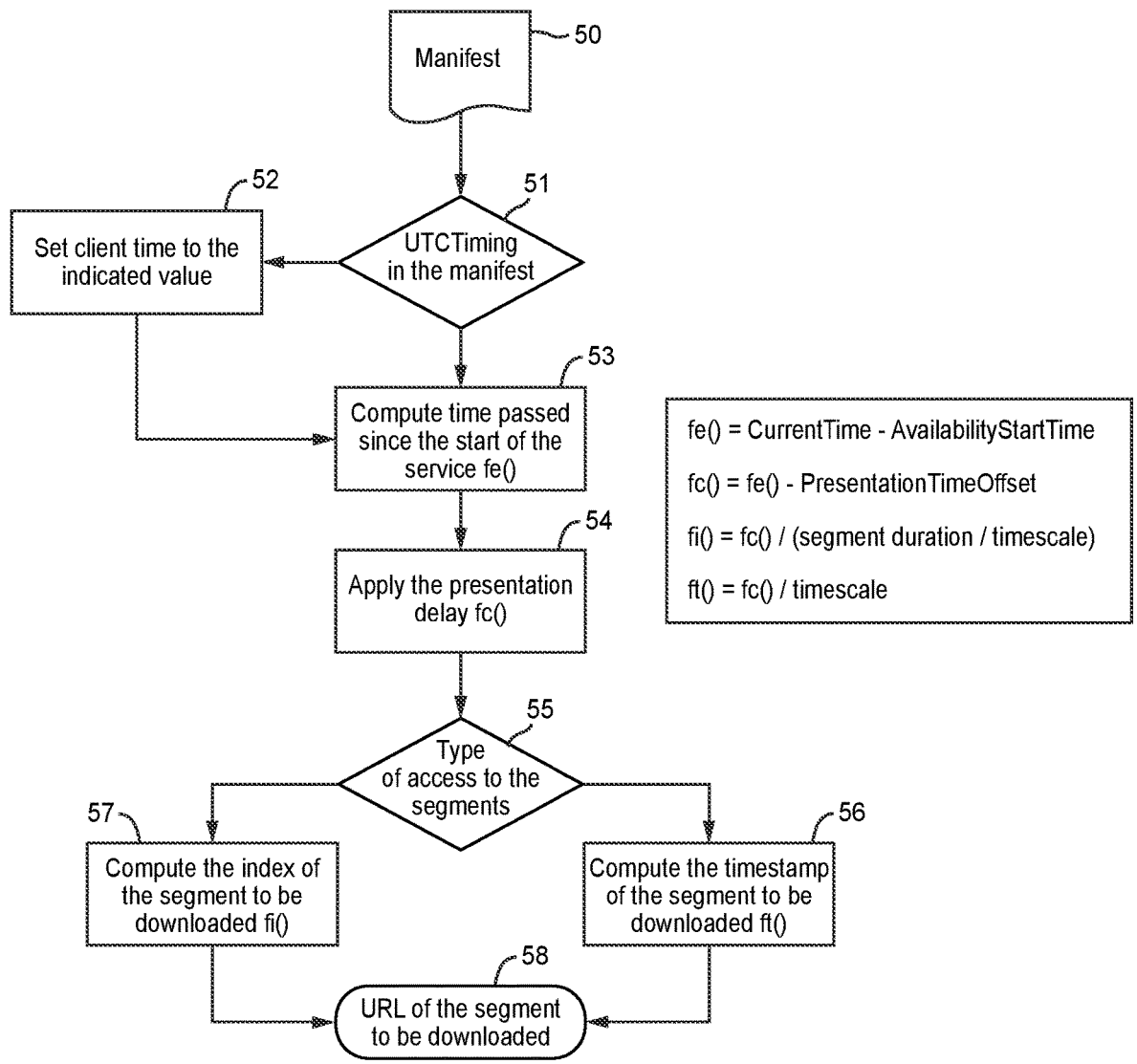
FIG. 3 presents the method for computing the segment to be downloaded in the case of multimedia content delivered in dynamic mode.

FIG. 3 illustrates an example of a method for playing live content using a video player client (or a video player). The illustrated method uses some of the information described above with respect to the example manifest illustrated in FIG. 2a to determine the data segment to download for each "AdaptationSet" of the current period, and thus to allow the client to tie into the content to be played.

The playback of a live content in the MPEG-DASH format is mainly linear. On its connection to the content server, the client initially retrieves the manifest containing information specific to the content delivered in dynamic mode (i.e. live), then begins the playback at the location of the content corresponding to the current time (in order to follow an event taking place in real time (or live)). To do this, it determines the current period by computing the time passed since the "availabilityStartTime" value indicated in the manifest, then determines the number of the "live" segment of this period by the same means.

With reference to FIG. 3, in one or more embodiments, the client obtains (50) a manifest corresponding to the live content to be played, then synchronizes (51) (52) with a multimedia-content server via the value of the attribute "UTCtiming" indicated in the manifest.

On the basis of the attribute "availabilityStartTime" and the current time ("CurrentTime"), the client may then determine (53) the time fe( ) passed since the start of the live multimedia content. As discussed above, depending on the encoding conditions, a delay ("PresentationTimeOffset") may be applied (54) to the transmission of the multimedia content in order to allow the encoder time to encode the segments, this leading to the determination of a time fc( ) defined by fe( )—PresentationTimeOffset. Lastly, depending on the size of the segments ("segment duration") defined in the manifest, and on a time-scale parameter ("TimeScale"), an index (57) fi( ) or a timestamp (56) ("TimeStamp") ft( ) of the current time segment may be calculated, depending on the type of segment (55). On the basis of this information, the client may obtain (58) a download address (for example a uniform resource locator (URL)), then download the segment of the current time of the multimedia content. An index of the segment of the current time will possibly for example be obtained by dividing the value fc( ) by the duration of one segment ("segment duration") divided by the time-scale value ("timescale"): fi( )=fc( )/(segment duration/timescale). A timestamp of the segment of the current time will possibly for example be obtained by dividing the value fc( ) by the time-scale value ("timescale"): ft( )=fc( )/timescale.

The values described above are supplied by the provider to the client through the manifest. The content provider may further influence the behavior of the client through means other than the manifest that the client downloads, and in particular by inserting a notification into a data segment. Thus, the insertion of a specific marker (for example taking the form of a "box") identified by a predetermined tag makes it possible to communicate control messages to the client. For example, the insertion of an "emsg" box into a data segment makes it possible to indicate to the client that he must immediately reload the manifest. Thus, a client configured to play an MP4 file or MPEG2 TS file (TS standing for transport stream) will parse this file (in its tree form) to detect all the information present therein, in particular including information notifying a request to load the manifest (for example notified via an "emsg" notification). It is thus possible to signal an unforeseen event that must be taken into account as soon as possible, thereby overriding the value of the attribute "minimumUpdatePeriod", which is more suitable for incremental modifications of the manifest.

A number of scenarios may, however, interrupt the logic of delivery of an event in dynamic mode, i.e. logic such as described above and illustrated in FIG. 3, one example being when it is desired to splice the client to a multimedia content other than the one being played (this content corresponding to a manifest referred to as the "main" manifest). These interruptions in the playback of a live multimedia content may for example correspond to the insertion of targeted advertisements, to events also taking place in real time such as for example a regional cutaway, or even to the broadcast of a warning message.

The following is the context of the particular case of insertion of targeted advertisements: During a commercial break in a content delivered in dynamic mode (live content), default advertisements are inserted into the initial data stream, i.e. the stream corresponding to the live content being played. The content provider may decide to redirect clients to targeted advertisements based on their respective profiles. To do this, the current period indicated in the current manifest (corresponding to the live content being played) may be closed, and a new period of a duration equal to that of the initial advertisement may be inserted into the current manifest, in the form of a time-interval description container ("Period" in the case of a container of a manifest in DASH format).

This time-interval description container may contain redirect data (for example indicated in an xml file by a redirect link of the "xlink" (XML linking language) type, which type is specified in the W3C recommendation "W3C XLINK XML Linking Language (XLink) Version 1.1, W3C Recommendation") redirecting to an ad server which, depending on a profile of the user of the client, will return a new manifest allowing advertisements tailored to this user to be accessed. The client will play the content described by the time-interval description container ("Period") of this new manifest for the duration of the period defined by the container. At the end of this period, the client will return to the current manifest in which the advertisement period will also have been closed and a new live period inserted in the form of another time-interval description container.

The particular case of a regional cutaway may be encountered when a television channel, such as the TV channel France 3, is broadcasting in real time national TV news programs that then cut away at set times to regional TV news programs. This use case is similar to that of advertisements because the duration of the cutaway is known in advance. In contrast, it is possible to imagine regional cutaways of durations that vary depending on the region.

Regarding the particular case of warning dissemination, regulations make provision for systems that allow current programs to be interrupted and warning messages broadcast. These messages may be pre-recorded and therefore of known duration, or be produced in real time. In the latter case, the duration of the interruption is not known in advance.

However, it turns out that the particular case of splicing from a first live content to a second live content without knowing the duration of the interruption of the playback of the first live content cannot be correctly managed, as explained below.

Specifically, these splices between multimedia contents are caused by the use of stream-splicing orders originating from equipment located upstream of the audio/video encoder. On receipt of these orders, the packager modifies the current manifest (corresponding to the live content being played) to notify the client of a change.

Among these stream-splicing orders, the order to splice to another stream ("splice out") indicates to the client that it must splice from a primary stream to a secondary stream, and the return order ("splice in") indicates to the client that it must return to the primary stream.

Splicing from a live primary stream to a live secondary stream (the two streams being delivered in dynamic mode), which is known as "live-live splicing" has drawbacks that are detailed below.

The DASH standard makes provision for a mechanism, called manifest chaining, for splicing between 2 live contents, which mechanism consists in forcing the DASH client to splice from a first live content to a second live content by switching to a new manifest, from a first manifest. This mechanism thus requires the player to switch to a secondary manifest that is different from the manifest being used by the client (which manifest is called the "primary" manifest or "current" manifest) to achieve a splice from a first live stream corresponding to the primary manifest, to a second live stream to which the secondary manifest corresponds. However, the switch from a first manifest to a second manifest has a few drawbacks, from the point of view of the continuity between successive periods (it is impossible to signal period continuity using manifest chaining such as specified), from the point of view of DRM (digital rights management) (as the URL of the manifest changes during the switch, the DASH client has to store the original period in order to determine that the same DRM configuration may be used, this being quite constraining from the point of view of the DASH client), and from the point of view of the management of the authentication tokens of the CDN server (as the manifest URL changes during the switch, the DASH client has to store the original period and the URL after redirection in order to determine that the same URL is being used and therefore not to repeat the step of authentication by the CDN, this being quite constraining from the point of view of the DASH client). Furthermore, during this switch, the player loses knowledge of the primary manifest, making it complicated, if not impossible, to return to the first live stream at the end of the splicing period (for example at the end of the broadcast of the warning in the aforementioned particular case of a broadcast warning).

For the management of a splice from a first content to a second content, it is possible to use redirect data (that redirect to data corresponding to the second content) inserted into the manifest, for example in an element defining a (not necessarily bounded) time interval relative to the second content. In the case of a manifest in DASH format, a redirect link of "xlink" type may thus be inserted into a container of "Period" type, as illustrated in FIG. 2b. The specification ISO/IEC 23009-1 "Information Technology—Dynamic adaptive streaming over HTTP (DASH)—Part 1: Media presentation description and segment formats" defines the insertion of a redirect link of xlink type into a manifest in DASH format.

FIG. 2b thus illustrates an example of a manifest in DASH format after insertion of a period, pointing to another content, in the form of a container of "Period" type comprising an xlink pointing to another manifest corresponding to (in particular in that it contains information allowing this other content to be accessed) this other content. The manifest illustrated in FIG. 2b comprises three periods, each in the form of a container of the "Period" type: a first period "P0", which corresponds to a period of a first live content, which begins at time 0 and which lasts 2 minutes and 18 seconds: "<Period id="P0" start="PT0S" duration="PT2M18S">".

After 2 minutes and 18 seconds, a splice order is received and the manifest is updated accordingly: the current period is closed and the duration attribute ("duration="PT2M18S"") added to the manifest. A second period ("P1") corresponding to a second content, of 30 s duration (corresponding for example to the duration of a second content of one or more advertisements), begins at time T0+duration of period P0 (2 minutes and 18 seconds) (start="PT138S"). The xlink (xlink: actuate="onLoad"xlink:href="http:// . . . " xmlns: xlink=http://www.w3.org/1999/xlink_in the example illustrated in FIG. 2b), inserted as additional attribute into the P1 "Period" container, allows access to this second content: "<Period id="P1" start="PT138S" duration="PT30S" xlink: actuate="onLoad" xlink:href="http:// . . . " xmlns: xlink="http://www.w3.org/1999/xlink">". Upon reading this xlink, the client will resolve the link, i.e. access the URL indicated by the link (in the example shown, in the property ""xlink:href="http:// . . . " xmlns:xlink=http://www.w3.org/1999/xlink") with a view to downloading a second manifest containing data relative to the access to the second content, then will extract from this second manifest one or more periods, in the form of one or more "Period" containers. Thus, the client will use the redirection to fetch information relative to this new period P1, via the information accessible via the xlink.

A third period (container "Period" "P2") corresponds to the return to the initial content following the interruption of the period P1. In the example of FIG. 2b, this period corresponds to the first live content and therefore has no specified duration: "<Period id="P2" start="PT168S">".

However, a problem has been identified, which would prevent correct implementation of a live-live splice (from a first live content with which a first manifest is associated to a second live content with which a second manifest is associated) employing a redirect mechanism such as specified in the aforementioned specification ISO/IEC 23009-1 (for example a redirect link of xlink type), to signal the target of the splice. Specifically, the temporal-synchronization information required by the client to obtain the segments of the second live content are present in the root element of the second manifest (MPD element in the DASH format), as described above with reference to FIGS. 2a and 2b, but not in each container defining a (not necessarily bounded) time interval relative to the second content. The standard ISO/IEC 23009-1 specifies that resolving an xlink inserted into a time-interval description container (defining a period), i.e. downloading the manifest at the address indicated by the xlink and extracting one or more periods (time-interval containers) from this manifest, must return not the full manifest, but only the one or more periods in question (a plurality of periods of the remote manifest (second manifest) possibly being substituted, via resolution of the xlink, for a period of the initial manifest (first manifest)). Thus, the resolution of a redirect xlink inserted into a time-interval description container ("Period") such as specified in the standard ISO/IEC 23009-1, does not allow the client to obtain any information contained in the remote manifest to which the link points other than the information contained in a time-interval description container of this remote manifest. In particular, the standard does not make provision for the client to be able to obtain elements specified by the standard as having to be included in the root (MPD) of the remote manifest. The consequence of this limitation of the standard is that, on the basis of a single period of live content (on the basis solely of information provided in a time-interval definition container (for example of "Period" type)), a client is unable to know when the stream (corresponding to the second content) started, and therefore cannot determine which segments are available for the second live content (for example using the method described above with reference to FIG. 3).

Thus, such as they are currently specified, redirect links of xlink type make it possible to cover the case of a cutaway from a first live content to a second non-live content (for example of vod type) and to return to a live content, i.e. a live->vod->live splicing sequence, but not the case of live-live splicing, comprising a cutaway from a first live content to a second live content, and then a potential return to the first live content. Specifically, resolving a redirect link of xlink type allows the DASH client to obtain one or more manifest periods (a time-interval description container), but not a full manifest. This is not a problem when the target of the splice is a non-live second content, for which the client does not need to obtain data allowing when the corresponding stream started to be determined, in order to determine which segments are available, since the start and duration of non-live content are predetermined. In contrast, the timing information that would allow the progress of the live second content to be computed, which is present as discussed above only in the root (MPD) of the second manifest, and not in the elements of this second manifest that define time periods, is not accessible to the client once the splice has been carried out.

Figure 4:
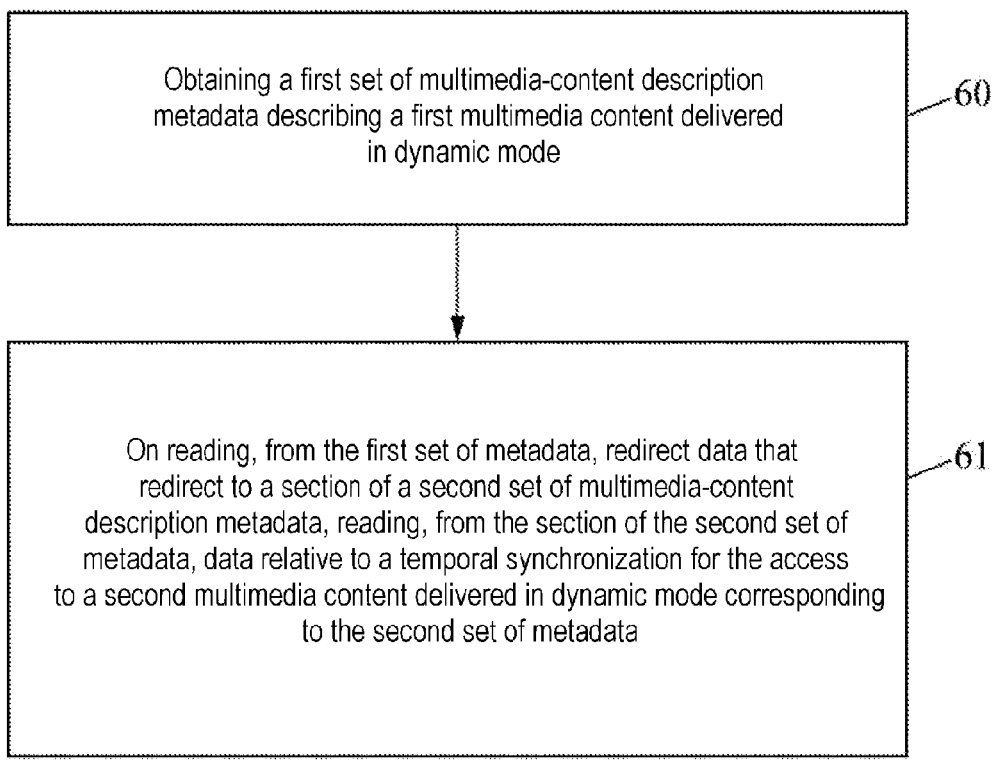
FIG. 4 illustrates the proposed method according to one or more embodiments.

FIG. 4 illustrates the proposed method according to one or more embodiments. This method may be implemented by any device comprising a processor and a memory, and configured to implement it, such as, for example, a multimedia content player, a terminal, a device running a DASH client or a client configured to receive and play multimedia contents using any other OTT protocol for delivering multimedia contents, or a user device (smartphone, tablet, computer, etc.) equipped with a multimedia content player.

In one or more embodiments, the device configured to implement the method may be configured to obtain a first set of content description metadata describing a first multimedia content delivered in dynamic mode (for example, for a DASH client, a first manifest in the format of the DASH protocol, and for example in the form of an XML file). The first set of metadata may describe a first multimedia content delivered in dynamic mode, for example by means of metadata relative to a first multimedia content delivered in dynamic mode and included in the first set.

The device may further be configured to read the first set of metadata, and to, upon reading, from the first set of metadata, redirect data for redirecting to a section of a second set of content description metadata, read (61) from the section of the second set of metadata data relative to a temporal synchronization of the access to a second multimedia content delivered in dynamic mode.

Typically, the second set of content description metadata will correspond to the second multimedia content delivered in dynamic mode. For example, this second set, to describe the second content, for example employs metadata relative to the second content and included in the second set.

Thus, the redirect data used in a first manifest makes it possible to cause a device, during read-out of this first manifest, to obtain the data contained in a specific section of a second manifest, in the course of read-out of the first manifest, i.e. without changing the current manifest being read.

This ability to be able to retrieve data from another manifest, without however changing the manifest being read, has a number of advantages: from the point of view of the continuity between successive periods, the manifest remaining the same, only the content of the splicing period is replaced. It is therefore possible to signal period continuity. From the point of view of DRM, the URL of the manifest remaining the same during splicing, it is possible for the device (player) to optimize the DRM configuration on return to the main stream. From the point of view of management of CDN authentication tokens, the URL of the manifest remaining the same during splicing, it is possible for the player to continue to use the same CDN authentication token on return to the main stream.

It is therefore particularly advantageous to use redirect data to splice from a first content to a second content, including in the particular case where the first and second contents are delivered in dynamic mode (case where the first content is a live content, and the second content is also a live content).

In one or more embodiments, the data relative to a temporal synchronization for the access to the second multimedia content delivered in dynamic mode are read, from the second set of content description metadata, from a time-interval description container relative to the second multimedia content.

In one or more embodiments, the data relative to a temporal synchronization for the access to the second multimedia content delivered in dynamic mode comprise data indicating a timestamp of availability of the second multimedia content.

In one or more embodiments, the data relative to a temporal synchronization for the access to the second multimedia content delivered in dynamic mode comprise data indicating information on accessibility of segments of the second multimedia content.

In one or more embodiments, the data relative to a temporal synchronization for the access to the second multimedia content delivered in dynamic mode correspond, entirely or partially, to data relative to a temporal synchronization that are provided in a root element of the second set of metadata.

In one or more embodiments, the data relative to a temporal synchronization for the access to the second multimedia content delivered in dynamic mode comprise data indicating a timestamp of availability of a first segment of the second content, data indicating a common duration used in the definition of bit rates associated with the second content and data indicating a timestamp of generation of the second set of metadata and of its publication on a multimedia content delivery network. In one or more embodiments, these data may further comprise one or more among data indicating a type of delivery of the second content, data indicating a timestamp of generation of a segment of the oldest second content still available, clock data, and data indicating a duration of a shortest timeshift buffer used for the second content. For example, in the case of a DASH manifest, the temporal-synchronization data inserted in a "Period" container (which may be read by a DASH client on resolution of a redirect link of xlink type) will possibly comprise at least the following elements: availabilityStartTime, minBufferTime, and publishTime.

As explained above, the splice from a first content to a second content may be managed in a first manifest relative to the first content (being read) via the use of a redirect link to a second manifest relative to the second content, for example signaled by a redirect link of "xlink" type for the DASH format. Live-live splicing, in the case where the first and second contents are delivered in dynamic mode, may thus be carried out without changing manifest.

Such as specified by the document ISO/IEC 23009-1 $3^{rd}$ edition, the redirect link of xlink type to a second manifest points to a section of this second manifest, not to the entirety of the second manifest. Thus, a client that resolves an xlink incorporated in a container defining a time interval (a "Period") of the first manifest, obtains an address of the second manifest (on the basis of information provided via the link), then downloads the section of the second manifest relative to the "Period", i.e. to the time interval defined in the first manifest. Thus, the client downloads, from the second manifest, information contained in a time-interval description container indicated by the redirect link, which corresponds to the time interval of the container of the first manifest that contains the redirect link (xlink for example).

The temporal-synchronization information required for the access to the second content in the time interval in question being available only in the root of the second manifest, which root is not read by the client when resolving an xlink, in one or more embodiments, it is proposed to include, in the time-interval description container of the second manifest (that the client does read when it resolves the redirect link) temporal-synchronization information for the access to the second content. A live-live splice, from the first multimedia content delivered in dynamic mode to the second multimedia content delivered in dynamic mode, will thus possibly, advantageously, be carried out using a redirect link, in particular in the context of the standard ISO/IEC 23009-1 3$^{rd}$ edition using a redirect link of xlink type.

In embodiments using a redirect mechanism to redirect to a second multimedia content delivered in dynamic mode, the device, parsing the first set of metadata, will be able to read redirect data for redirecting to a section of a second set of multimedia-content description metadata for the access to the data of a second multimedia content delivered in dynamic mode. The device will possibly be configured to, upon reading these redirect data, read, from the section of the second set of multimedia-content description metadata, data relative to a temporal synchronization for the access to the second multimedia content delivered in dynamic mode. These data relative to temporal synchronization will possibly advantageously be read by the device, for the access to the second live content, thus mitigating the absence of timing information, and in particular allowing the progress of the second live content to be computed, from the time-interval description container (of the element ("Period")) of the second set of metadata, to which container a redirect link of xlink type inserted into a time-interval description container of the first set will point (as specified by the standard ISO/IEC 23009-1 3$^{rd}$ edition).

Thus, the proposed method advantageously allows, in the context of the standard ISO/IEC 23009-1, the use of a redirect link of xlink type to perform a live-live splice, i.e. a splice during playback from a first multimedia content delivered in dynamic mode to a second multimedia content delivered in dynamic mode, by inserting, into a time-interval description container of a second manifest that the client will read when an xlink inserted into a time-interval description container of a first manifest is resolved, temporal-synchronization data for the access to the second content delivered in dynamic mode.

In one or more embodiments, the device will possibly further obtain an update of the first set of content description metadata on the expiration of a time period corresponding to the duration of the second live multimedia content, in order to potentially splice back to the first live content once the period of playback of the second live content has expired.

In one or more embodiments, the data relative to a temporal synchronization for the access to the second multimedia content delivered in dynamic mode may be inserted into a section of the second set of multimedia-content description metadata, to which section the redirect link inserted into the first set of metadata points, so that these data are read (by way of data of the section of the second set) during the resolution of the link by a device in the process of reading the first set of metadata. In one or more embodiments, the section, of the second set of multimedia-content description metadata, into which data relative to a temporal synchronization for the access to the second multimedia content delivered in dynamic mode are inserted, corresponds to a time-interval description container relative to the second multimedia content. It may for example be a question of a container corresponding to the attribute or element "Period" (described above) in a manifest of format specified by the standard ISO/IEC 23009-1. Thus, these data may advantageously be taken into account during a linear read-out by the device of the time-interval description container of the second manifest, on read-out of redirect information inserted into a time-interval description container of the first manifest.

In one or more embodiments, the timing data inserted into the section of the second manifest may be grouped together within a specific container, for example titled "LivePeriod", and identified in the manifest by corresponding tags ("LivePeriod" for the start of the container, and "/LivePeriod" for the end of the container), for example in XML syntax. An example of a LivePeriod container such as proposed in one or more embodiments is shown in FIG. 6C.

In one or more embodiments, the data relative to a temporal synchronization for the access to the second multimedia content delivered in dynamic mode may comprise data indicating a timestamp of availability of the second multimedia content. For example, these data may comprise temporal-synchronization information that will allow the client to know when the live stream corresponding to the second content has started.

In one or more embodiments, the data relative to a temporal synchronization for the access to the second multimedia content delivered in dynamic mode may comprise data indicating information on accessibility of segments of the second multimedia content. For example, these data may comprise temporal-synchronization information that will allow the client to know which are the segments corresponding to the second content that are currently accessible.

In one or more embodiments, the types of data relative to a temporal synchronization for the access to the second multimedia content delivered in dynamic mode will possibly correspond to certain at least of the types of data relative to a temporal synchronization that are provided in a root element of the second set of metadata.

For example, the syntax of DASH manifests will possibly be enriched by inserting a copy of the time information required by the DASH client to tie into the current stream, this information being delivered, to the root of the second manifest, in a new container (or element) added to the time-interval description element (container) for the second live content.

In one or more embodiments, the data relative to a temporal synchronization for the access to the second multimedia content delivered in dynamic mode may comprise data indicating a type of the second content, and one at least among data indicating a timestamp of availability of a first segment of the second content, data indicating a timestamp of generation of a segment of the oldest second content still available, and data indicating a common duration used in the definition of bit rates associated with the second content, clock data, and data indicating a duration of a shortest timeshift buffer used for the second content.

For example, using the DASH format, a new element (for example denoted "LivePeriod") will possibly be added to the "Period" element, and comprise time information that will allow the receiver to know when this stream started and which are the segments currently accessible. In one embodiment, the new "LivePeriod" element will possibly contain elements among the elements "type", "availabilityStartTime", "publishTime", "availabilityEndTime", "minimumUpdatePeriod", "minBufferTime", "timeShiftBufferDepth" and "UTCTiming" to indicate to the receiver that it is a question of a live stream, when this stream started and which are the segments currently accessible.

In one embodiment in which a splice from a first live content to a second live content is carried out on resolution of an xlink in a manifest in DASH format, the type of content will be dynamic (delivery in dynamic mode for a live content) (type=dynamic), and the proposed new element will possibly contain at least the elements "availabilityStartTime", "publishTime" and "minBufferTime", in accordance with the DASH specification (ISO/IEC 23009-1), section 5.3.1.2 table 5.1, which specifies that the following elements are mandatory in dynamic mode: availabilityStartTime, minBufferTime, and publishTime. The other elements will possibly not be present among the data relative to a temporal synchronization that are inserted into the section of the second manifest that will be read by the client on the resolution of redirect data read from a first manifest. The same goes for the syntax element <LivePeriod>, which will possibly not be present in one or more embodiments.

In one or more embodiments, the data relative to a temporal synchronization that are inserted into the section of the second manifest that will be read by the client on the resolution of redirect data read from a first manifest will comprise the data specified as mandatory, by the applicable standard, for the access to a content delivered in dynamic mode in the corresponding set of metadata.

Figure 5:
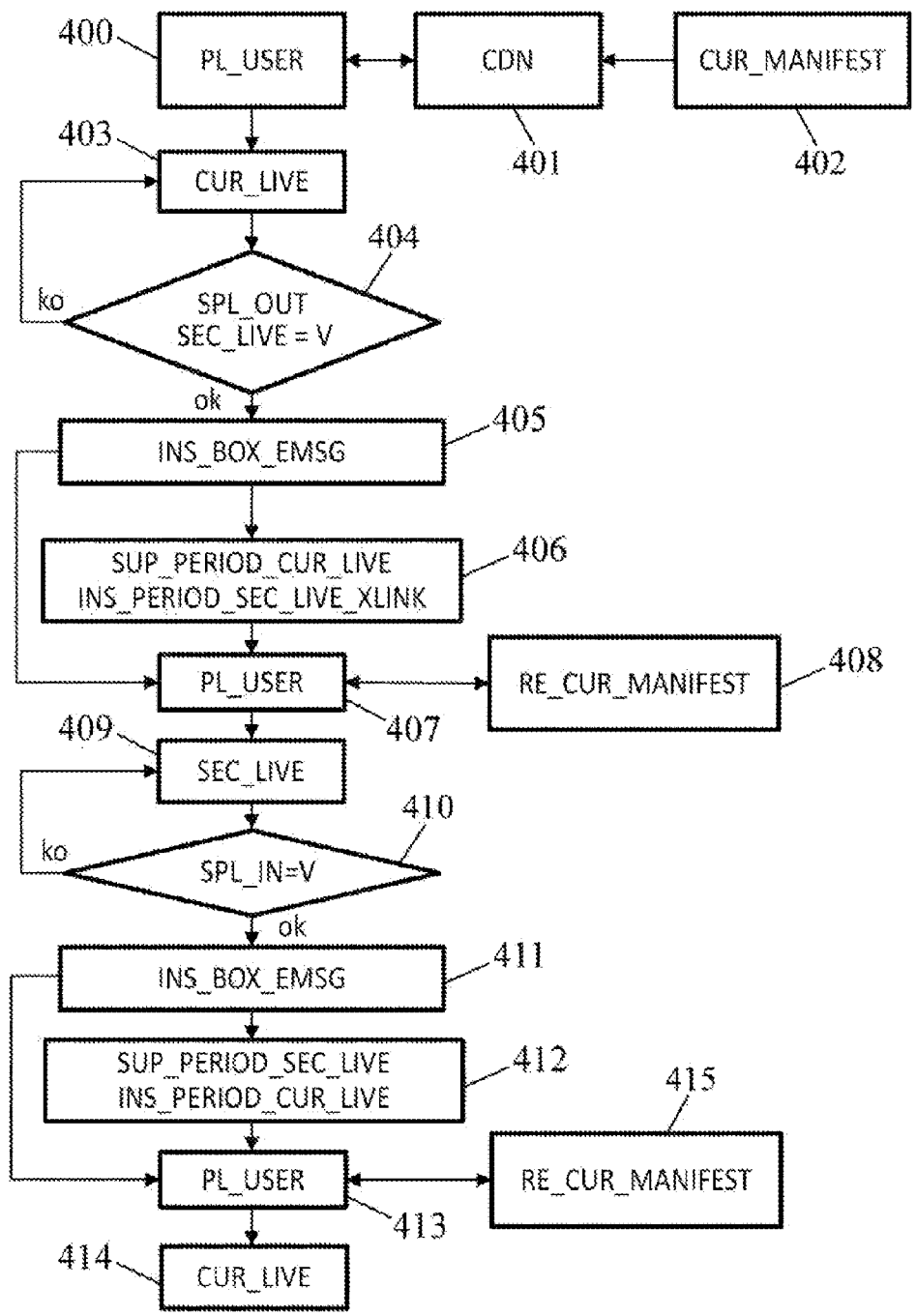
FIG. 5 illustrates the proposed method according to one or more embodiments.

FIG. 5 illustrates an example of implementation of the proposed method according to one or more embodiments.

Thus, as above, a DASH client wishing to play a video sequence delivered in dynamic mode (or current live stream) initially makes a request to a content delivery network (CDN) (401) in order to obtain (402) the manifest (set of description metadata) of the current live stream, on provision of authentication information. The CDN executes a client-authentication procedure and, in case of success, returns a token to the client and redirects it to a network address (for example a URL) at which the current manifest (corresponding to the current live stream) is accessible. client. The DASH client 200 may thus tie into the current live stream (403). In order to be able to correctly tie into the current live stream, the DASH client determines, from the information contained in the current manifest, for example using the method illustrated in FIG. 3, the segment that it must download, depending on the current time and the time passed, to tie into the current stream, it for example doing this by determining an index of this segment or a timestamp as described above.

Once the DASH client has tied into the current stream (404), it continuously plays (404, ko) this current stream, in the absence of a client splice-out request.

When the packager receives a splice-out order (404, ok), the packager inserts a notification ("box Emsg") requiring a splice into the last data segment of the current live stream (405) before the splice time. This "box" is used to indicate to the DASH 407 (400) client that it must immediately reload the current manifest associated with the current live stream. At the same time, and before the current manifest is reloaded, the packager deletes or suppresses the period ("SUP_PERIOD_CUR_LIVE") of the current live stream and inserts the one or more periods of the secondary live stream (INS_PERIOD_SEC_LIVE_XLINK) via an xlink. An xlink is used to indicate a target of the splice to the manifest. On use of an xlink, a period is returned that replaces the current period of the manifest containing the xlink.

In order to insert the period of the secondary live stream, a child element of the MPD, called "LivePeriod", is added to the "Period" element of the secondary manifest that the DASH client will read when resolving the xlink, so that the DASH client may tie into the secondary live stream at the current time. To this end, the "LivePeriod" element is composed of attributes allowing the segment of the current period, that the reader 407 (400) must retrieve in order to tie into the secondary live stream without the appearance of a time delay, to be computed. This computation is equivalent to that presented above with reference to FIG. 3. The attributes of the child element "LivePeriod" may be, in one or more embodiments: type="dynamic"; availabilityStartTime; publishTime; availabilityEndTime; minimumUpdatePeriod; minBufferTime; timeShiftBufferDepth and UTCTiming.

During the reload of the current manifest 408, the DASH client 407 will thus load the xlink and resolve the link, i.e. access the data to which the link points. From these data, the reader will compute and determine the segment of the current period to be retrieved in order to tie into, without time delay, the secondary live stream (409).

If the duration of the secondary live stream is unknown, "410 ko", the player continues playing the secondary live stream as long as no splice-in order is received.

When a splice-in request arrives, i.e. a request to return to the current live stream, an "Emsg box" (411) is inserted by the packager into the last data segment of the secondary live stream before the time of the splice. As above, the purpose of this "box" is to indicate to the DASH client 412 that it must reload the current manifest.

At the same time, and before the current manifest is reloaded, the packager deletes or suppresses the period ("period") of the secondary live stream and inserts the period of the current live stream (412) via information (attributes) of the current manifest still available in the root of the MPD. On the reload of the current manifest (415), the DASH client 412 (407; 400) ties into the current live stream without time delay.

Without the preceding provisions, i.e. a "LivePeriod" child element, it is not possible on use of an xlink, to wait for a secondary live stream because the information allowing the computation of the segment to be downloaded to tie into the secondary live stream at the current time are not available in an xlink. Specifically, as explained above and illustrated in FIG. 3, the computation making it possible to determine the segment to be downloaded uses information (attributes) that are available only in the root of the manifest. On use of an xlink, the period of the main video sequence/stream is replaced by the one or more periods that are reachable via the xlink, and that correspond to another video sequence, such as commercials for example. The "Period" child element allowing one period to be replaced with another does not possess attributes that allow computation of the segment to be downloaded in order to tie into a video sequence that is being generated in real time.

FIGS. 6a, 6b and 6c illustrate manifests using a redirect indication to insert VOD content into a live stream (FIG. 6a), and to tie into a secondary live stream from a primary live stream (FIGS. 6b and 6c).

With reference to FIG. 6a, the period P0 is the initial period of the live content: it starts at T0 and its duration corresponds to the time before the splice out. The period P1 is the cutaway period: its duration is set and known in advance, and it is inserted into the manifest at the same time as the period of return to live, in order to allow the player to preload the segments. The resolution of the xlink makes it possible to obtain information related to this period, in order to substitute this information for the information present in the manifest. The period P2 is the period of return to the initial content: it starts at the sum of the durations of the preceding periods and its duration is not known.

FIG. 6b provides an illustration of an example of a first manifest including a redirect link pointing to a section of a second manifest, and FIG. 6c an example of a second manifest improved according to the proposed method.

With reference to FIG. 6b, the period P0 is the initial period of the live content: it starts at T0 and its duration corresponds to the time before the splice out, as described above with reference to FIG. 6a.

Unlike the manifest illustrated in FIG. 6a, the period P1 of the manifest illustrated in FIG. 6b is a cutaway period corresponding to a live content that started at some unknown time. The example of the redirect link from the first manifest shown in FIG. 6b (xlink:actuate="onLoad" xlink:href="http:// . . . " xmlns:xlink=http://www.w3.org/1999/xlink) included in the time-interval description container <Period id="P1" start="PT10H00M00S" xlink:actuate="onLoad" xlink:href="http:// . . . " xmlns:xlink="http://www.w3.org/1999/xlink"> <AdaptationSet id="0" contentType="video" . . . > </AdaptationSet> <AdaptationSet id="1" contentType="audio" . . . > </AdaptationSet>, </Period>, may for example point to the second manifest illustrated in FIG. 6c.

With reference to FIG. 6c, resolving the redirect link (xlink) to read the second manifest to which it points makes it possible to obtain timing information (temporal-synchronization information) related to the period defined by the "Period" container of the second manifest (illustrated in FIG. 6b), into which the redirect link is inserted. In order to allow the client to access the segments of the content to which the second manifest corresponds, a new container (new ("LivePeriod") element) is added to the time-interval description container (to the element "Period") to which the redirect link (xlink) of the first manifest (FIG. 6b) points: "<LivePeriod type="dynamic" availabilityStartTime="2019-03-01T14:00:00Z" publishTime="2019-03-01T14:00:00Z" minimumUpdatePeriod="PT10S" minBufferTime="PT2S" timeShiftBufferDepth="PT10S" UTCTiming="urn:mpeg:dash:utc:http-ntp:2014"/>. It contains time information that will allow the receiver to know when this stream started and which are the segments currently accessible. FIG. 6c illustrates an example of a proposed container ("LivePeriod") comprising the following types of data: type; availabilityStartTime; publishTime; minimumUpdatePeriod; minBufferTime; timeShiftBufferDepth; UTCTiming, with examples of values for each of these data types.

Those skilled in the art will understand that, although these examples and illustrations correspond to the standard of document ISO/IEC 23009-1, these examples and illustrations are non-limiting, and the proposed method may be implemented in other contexts, and in particular in the context of other standards, and/or using different formats and syntaxes.

Figure 6D:
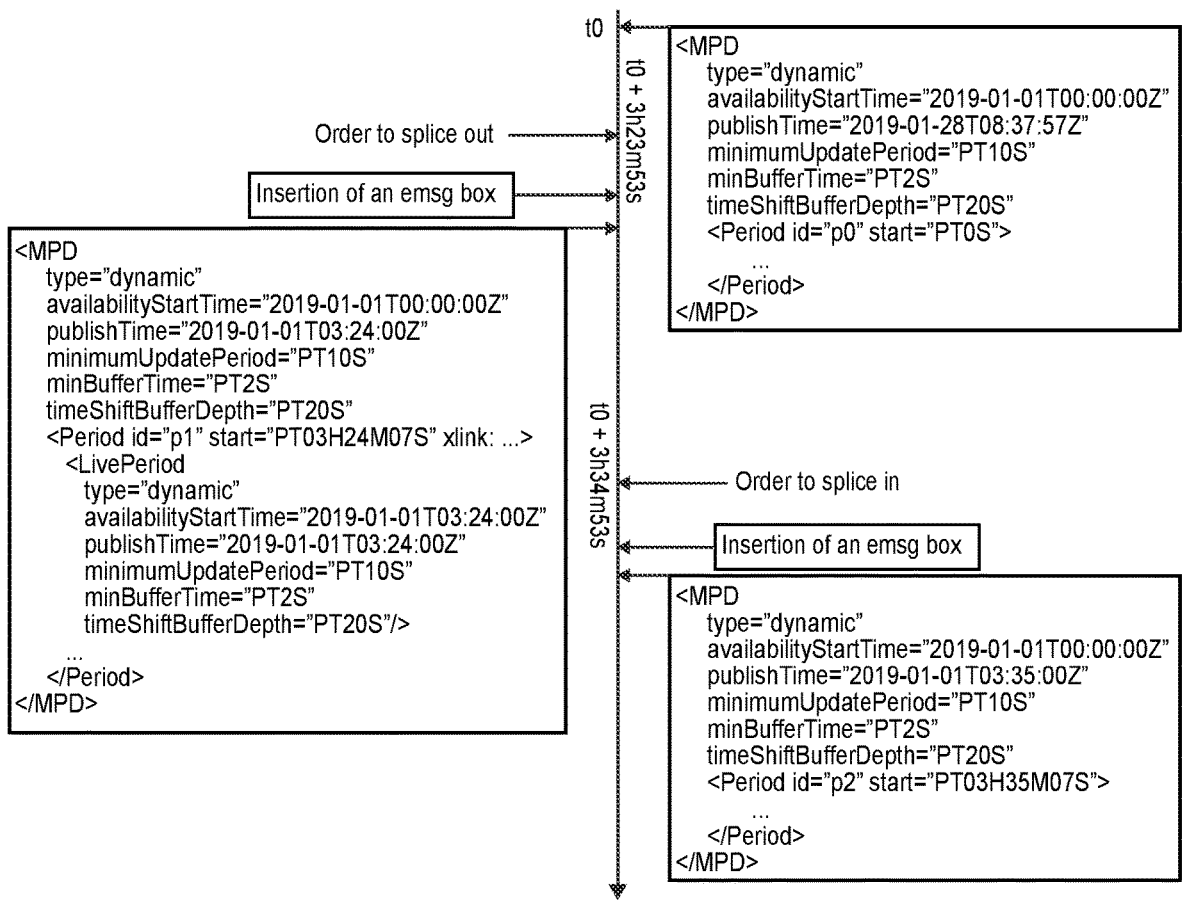
FIG. 6d is a timing diagram illustrating a switch from a first live content to a second live content.

FIG. 6d is a timing diagram illustrating a live1-to-live 2 cutaway then a return to live 1 performed according to one or more embodiments.

In the initial state, the manifest contains only a single period corresponding to the primary live stream. On the arrival of a splice-out order, the packager performs the following operations: Insertion of an 'emsg' box into the last data segment of the main stream before the time of the splice. This box will indicate to the DASH client that it must immediately reload the manifest. Deletion of the main live period from the manifest and insertion of the secondary live period with the xlink. The resolution of this xlink will allow the DASH client to obtain information relative to the one or more periods of the secondary stream and to begin decoding.

Since the duration of the secondary live stream is not known, the DASH client continues to play this stream until it receives other information.

On arrival of a splice-in order, the packager performs the following operations: Insertion of an 'emsg' box into the last data segment of the secondary stream before the time of the splice. This box will indicate to the DASH client that it must immediately reload the manifest. Deletion of the secondary live period from the manifest and insertion of the main live period. The DASH client already has the necessary information on the primary stream, and may therefore resume decoding.

This phase of returning to the main live stream requires the splicing orders to be synchronized between the main and secondary packager.

Return to the primary stream: In the case of a splice to a secondary live stream, the client must start playback as soon as the splice is signaled. However, if the client is shifted in time with respect to the live edge of the live stream (time shift), it will wait until the end of the current period before splicing. It will therefore not be able to access the start of the secondary live stream. This lag is unacceptable, in particular for cutaways to warning messages. This problem may be solved by inserting an 'emsg' box into the video segment preceding the splice. This box will indicate to the DASH client that it must reload the manifest immediately, regardless of the value of the attribute minimumUpdatePeriod. At the same time, the packager will have deleted the main live period from the manifest, leaving only the secondary live period with the xlink. On reload of the manifest, the DASH client will therefore have no choice but to start on the period of the secondary stream, regardless of its read position in the timeshift buffer. The same mechanism will be used to force DASH clients to return to the main stream. The packager will insert an emsg box, delete the period of the secondary live stream from the manifest and add a period corresponding to the main live stream.

Thus, the proposed method advantageously makes it possible to use xlinks in a system using the DASH standard to splice from a first content delivered in dynamic mode to a second content also delivered in dynamic mode. This makes it possible to obtain a new mode of splicing from a first content delivered in dynamic mode to a second content also delivered in dynamic mode, while benefiting, in the context of this splice, from the advantages that this mode provides (in particular in terms of continuity between successive periods, DRM and authentication management, as discussed above). These advantages may be lacking in other methods allowing a splice from a first content delivered in dynamic mode to a second content also delivered in dynamic mode, such as for example the methods based on a change of manifest.

Figure 7:
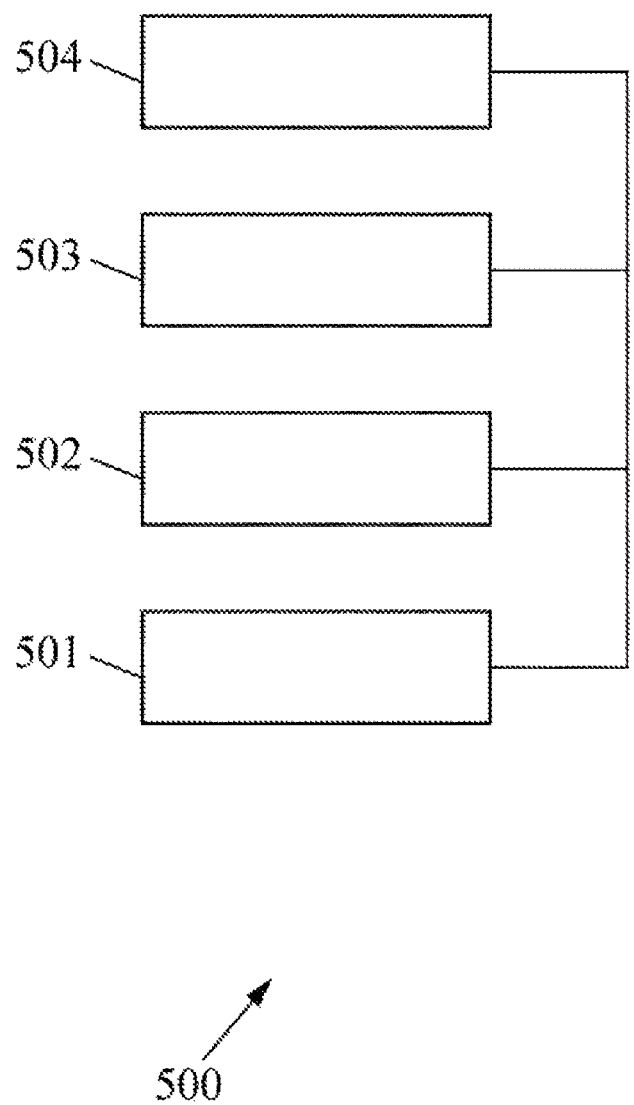
FIG. 7 illustrates an example of a device architecture for implementing the proposed method according to one or more embodiments.

FIG. 7 illustrates an example of an architecture of a device for playing multimedia contents delivered in dynamic mode for the implementation of the proposed method.

With reference to FIG. 7, the device 500 comprises a controller 501, operationally coupled to an input interface 502 and to a memory 504, which drives a multimedia-content player unit 503.

The input interface 502 is configured to receive, from a content server, data segments (audio and/or video segments) corresponding to multimedia contents delivered in dynamic mode, and sets of metadata corresponding to these contents.

The controller 501 is configured to drive the multimedia-content playback unit 503 to implement one or more embodiments of the proposed method.

The device 500 may be a computer, a computer network, an electronic component, or another apparatus comprising a processor operationally coupled to a memory, and, depending on the embodiment chosen, a data storage unit, and other associated hardware elements such as a network interface and a medium reader for reading a removable storage medium and writing to such medium (not shown in the figure). The removable storage medium may be, for example, a compact disc (CD), a digital video/versatile disk (DVD), a flash disk, a USB stick, etc. Depending on the embodiment, the memory, the data storage unit or the removable storage medium contains instructions that, when they are executed by the controller 501, cause this controller 501 to perform or control the input-interface portion 502, the multimedia-content-player portion 503 and/or the data-processing portion of the examples of implementation of the proposed method that are described herein. The controller 501 may be a component employing a processor or a computing unit to play multimedia contents according to the proposed method and to control the units 502, 503 and 504 of the device 500.

Furthermore, the device 500 may be implemented in software form, as described above, or in hardware form (e.g. application specific integrated circuit (ASIC)), or in the form of a combination of hardware and software elements, such as for example a software program intended to be loaded into and executed by an field programmable gate array (FPGA).

INDUSTRIAL APPLICATION

Depending on the embodiment chosen, certain acts, actions, events or functions of each of the methods described in the present document may be performed or occur in a different order to that in which they have been described, or may be added, merged or indeed not be performed or not occur, as the case may be. Furthermore, in certain embodiments, certain acts, actions or events are performed or occur concurrently and not successively.

Although described by way of a certain number of detailed exemplary embodiments, the proposed control method and the device for implementing an embodiment of the method comprise various variants, modifications and improvements that will appear obvious to anyone skilled in the art, and it will be understood that these various variants, modifications and improvements form part of the scope of the invention, such as defined by the following claims. In addition, various aspects and features described above may be implemented together, or separately, or indeed substituted for each other, and all of the various combinations and sub-combinations of the aspects and features form part of the scope of invention. Furthermore, it is possible for certain of the systems and pieces of equipment described above to not incorporate all of the modules and functions described with respect to the preferred embodiments.

The invention claimed is:

1. A method for managing multimedia contents, the method comprising:
obtaining a first set of multimedia-content description metadata describing a first multimedia content delivered in dynamic mode; and
upon reading, from the first set of multimedia-content description metadata, redirect data for redirecting to a section of a second set of multimedia-content description metadata, reading, from the section of the second set of multimedia-content description metadata, data relative to a temporal synchronization of the access to a second multimedia content delivered in dynamic mode.

2. The method as claimed in claim 1, wherein the second set of multimedia-content description metadata describes the second multimedia content delivered in dynamic mode.

3. The method as claimed in claim 1, wherein the data relative to a temporal synchronization for the access to the second multimedia content delivered in dynamic mode are read, from the second set of multimedia-content description metadata, from a time-interval description container relative to the second multimedia content.

4. The method as claimed in claim 1, wherein the data relative to a temporal synchronization for the access to the second multimedia content delivered in dynamic mode comprise data indicating a timestamp of availability of the second multimedia content.

5. The method as claimed in claim 1, wherein the data relative to a temporal synchronization for the access to the second multimedia content delivered in dynamic mode comprise data indicating information on accessibility of segments of the second multimedia content.

6. The method as claimed in claim 1, wherein the data relative to a temporal synchronization for the access to the second multimedia content delivered in dynamic mode correspond to data relative to a temporal synchronization that are provided in a root element of the second set of metadata.

7. The method as claimed in claimed 1, wherein the data relative to a temporal synchronization for the access to the second multimedia content delivered in dynamic mode comprise data indicating a timestamp of availability of a first segment of the second content, data indicating a common duration used in the definition of bit rates associated with the second content and data indicating a timestamp of generation of the second set of multi-media content description metadata and of its publication on a multimedia content delivery network.

8. The method as claimed in claim 1, wherein the first and second sets of multimedia-content description metadata are manifests in DASH format, DASH standing for dynamic adaptive streaming over HTTP.

9. A device for playing multimedia content, comprising a processor and a memory that is operationally coupled to the processor, wherein the processor is configured to implement a method for managing multimedia contents, the method comprising:
obtaining a first set of multimedia-content description metadata describing a first multimedia content delivered in dynamic mode; and
upon reading, from the first set of multimedia-content description metadata, redirect data for redirecting to a section of a second set of multimedia-content description metadata, reading, from the section of the second set of multimedia-content description metadata, data relative to a temporal synchronization of the access to a second multimedia content delivered in dynamic mode.

10. The device as claimed in claim 9, wherein the second set of multimedia-content description metadata describes the second multimedia content delivered in dynamic mode.

11. The device as claimed in claim 9, wherein the data relative to a temporal synchronization for the access to the second multimedia content delivered in dynamic mode are read, from the second set of multimedia-content description metadata, from a time-interval description container relative to the second multimedia content.

12. The device as claimed in claim 9, wherein the data relative to a temporal synchronization for the access to the second multimedia content delivered in dynamic mode comprise data indicating a timestamp of availability of the second multimedia content.

13. The device as claimed in claim 9, wherein the data relative to a temporal synchronization for the access to the second multimedia content delivered in dynamic mode comprise data indicating information on accessibility of segments of the second multimedia content.

14. The device as claimed in claim 9, wherein the data relative to a temporal synchronization for the access to the second multimedia content delivered in dynamic mode correspond to data relative to a temporal synchronization that are provided in root element of the second set of metadata.

15. The device as claimed in claim 9, wherein the data relative to a temporal synchronization for the access to the second multimedia content delivered in dynamic mode comprise data indicating a timestamp of availability of a first segment of the second content, data indicating a common duration used in the definition of bit rates associated with the second content and data indicating a timestamp of generation of the second set of multimedia-content description metadata and of publication of the second set of multimedia-content description metadata on a multimedia content delivery network.

16. The device as claimed in claim 9, wherein the first and second sets of multimedia-content description metadata are manifests in DASH format, DASH standing for dynamic adaptive streaming over HTTP.

17. A non-transitory computer-readable medium on which is stored a computer-executable program, comprising a data set representing one or more programs, said one or more programs comprising instructions that, on execution of said one or more programs by a computer comprising a processing unit operationally coupled to memory means and to an input/output interface module, cause the computer to manage multimedia contents according to a method for managing multimedia contents, comprising:
 obtaining a first set of multimedia-content description metadata describing a first multimedia content delivered in dynamic mode; and
 upon reading, from the first set of multimedia-content description metadata, redirect data for redirecting to a section of a second set of multimedia-content description metadata, reading, from the section of the second set of multimedia-content description metadata, data relative to a temporal synchronization of the access to a second multimedia content delivered in dynamic mode.

18. The non-transitory computer-readable medium as claimed in claim 17, wherein the second set of multimedia-content description metadata describes the second multimedia content delivered in dynamic mode.

19. The non-transitory computer-readable medium as claimed in claim 17, wherein the data relative to a temporal synchronization for the access to the second multimedia content delivered in dynamic mode are read, from the second set of multimedia-content description metadata, from a time-interval description container relative to the second multimedia content.

20. The non-transitory computer-readable medium as claimed in claim 17, wherein the data relative to a temporal synchronization for the access to the second multimedia content delivered in dynamic mode comprise data indicating a timestamp of availability of the second multimedia content.

* * * * *